United States Patent [19]
Lundahl

[11] Patent Number: 5,220,905
[45] Date of Patent: Jun. 22, 1993

[54] REDUCING EMISSIONS USING TRANSPORT DELAY TO ADJUST BIASED AIR-FUEL RATIO

[76] Inventor: Brad Lundahl, 16450 Bonnie La., Los Gatos, Calif. 95032

[21] Appl. No.: 916,167

[22] Filed: Jul. 17, 1992

[51] Int. Cl.⁵ .................................. F02D 41/14
[52] U.S. Cl. ..................... 123/681; 123/696
[58] Field of Search ............. 123/492, 493, 672, 681, 123/682, 683, 684, 693, 694, 696

[56] References Cited

U.S. PATENT DOCUMENTS

| Re. 31,174 | 3/1983 | Herth et al. ............ 123/696 X |
|---|---|---|
| 4,282,842 | 8/1981 | Sasayama ............ 123/684 |
| 4,428,345 | 1/1984 | Bertsch et al. ............ 123/681 |
| 4,848,300 | 7/1989 | Samuel et al. ............ 123/681 |
| 4,926,826 | 5/1990 | Nakaniwa et al. ............ 123/696 |
| 4,932,384 | 6/1990 | Weingärtner ............ 123/679 |
| 4,945,882 | 8/1990 | Brown et al. ............ 123/695 |
| 5,016,595 | 5/1991 | Kawai et al. ............ 123/478 |
| 5,033,440 | 7/1991 | Kumagai et al. ............ 123/680 |

OTHER PUBLICATIONS

Ribbens, William B. and Mansour, Norman P., *Understanding Automotive Electronics*, chapters 5 and 6, Howard Sams & Co., Indianapolis, Ind., 1982.

Shiga, Hiromu and Mizutani, Shuji, *Car Electronics*, p. 64, ALCA, Inc., 1988.

*Primary Examiner*—Tony M. Argenbright
*Attorney, Agent, or Firm*—Schneck & McHugh

[57] ABSTRACT

A method for controlling the air-fuel ratio in an internal combustion engine equipped to operate from a gaseous alternative fuel. The output signal of the engine's exhaust gas oxygen sensor is used to measure the variable engine transport delay. The variable is used to approximate a reciprocal of the delay. The reciprocal is used as a representation of the variable engine mass air-flow. A limit cycle operating in a transport-delay-oscillator mode is modified by extending the duration of the enrichment phase in proportion to the mass air-flow. The resulting exhaust gas concentrations are biased rich and thus shifted within an optimum operating window of the engine's gasoline catalytic converter. A significant reduction of unwanted exhaust emissions is observed.

19 Claims, 3 Drawing Sheets

REDUCING EMISSIONS USING TRANSPORT DELAY TO ADJUST BIASED AIR-FUEL RATIO

TECHNICAL FIELD

The present invention relates generally to the field of internal combustion engine exhaust emissions control, and in particular to closed-loop control of the air-fuel ratio to reduce exhaust emissions while using gaseous alternative fuels.

BACKGROUND ART

When a modern gasoline engine and emissions system is retrofit with known gaseous alternative fuel systems, several problems occur during operation with alternative fuels such as methane or propane. Alternate fuel combustion chemistry is substantially different than gasoline combustion chemistry. The gasoline engine and its emissions system have been optimized for gasoline fuel combustion chemistry and optimized to provide the lowest possible emissions while providing maximum fuel economy. When a gasoline engine and emission system are operated on an alternative fuel, the emissions can be consequently higher than on gasoline and fuel economy can be poor. Cold weather starting and drivability are deficient in comparison with gasoline operation as a result of incorrect air-fuel mixtures.

The best available alternative fuels air-fuel mixing systems have wide variations in air-fuel ratio due to atmospheric pressure, repeatability, hysteresis, temperature, installation and numerous other factors. Available alternative fuel feedback control systems used in conjunction with alternative fuel mixers use a closed-loop limit-cycle controller (see FIGS. 1 and 2) to compensate for these variations. A helpful explanation of the closed-loop limit-cycle controller used in electronic emissions control systems is found in Ribbens, Wm. B. and N. P. Mansow, *Understanding Automotive Electronics*. Indianapolis, Howard W. Sams & Co., 1984, at pages 168-173.

A limit-cycle controller cycles about a set point of stoichiometry, but under normal driving conditions the optimum air-fuel ratio constantly changes as fuel demand and engine load vary. The limit-cycle controller is slow to respond to these changes with a resulting increase in overall exhaust emissions. Even at the steady state, operation about the set point of stoichiometry in accordance with the exhaust gas emission oxygen sensor in a modern gasoline system produces exhaust gas chemistry that is not compatible with the gasoline emission system catalytic converter and therefore produces excessively high emissions.

These high emissions can be reduced, with varying degrees of success, by biasing an air fuel ratio to shift the resulting emissions concentrations within an optimum operating region for a catalytic converter (see for example H. Shiga and S. Mizutani, *Car Electronics*, Warrendale, Pa., SAE, 1988, FIG. 3.9 at page 64, and *Understanding Automotive Electronics*, pages 163-166.)

U.S. Pat. No. 5,033,440 to Kumagai teaches use of a leanness bias in air-fuel ratio in an internal combustion engine when an airflow sensor detects low mass airflow.

U.S. Pat. No. 5,016,595 to Kawai et al. teaches use of a leanness bias at high values of mass airflow and also at high altitude.

A two-fold improvement in transient response, with corresponding reduction of unwanted emissions, is obtained by introducing the concept of a fuel wavefront and permitting the limit cycle to operate in a natural transport delay-oscillator mode (see FIG. 3).

U.S. Pat. No. 4,932,384 to Weingärtner teaches use of periodic high frequency control intervals periodically inserted between a pair of transport delay control cycles during steady state conditions.

U.S. Pat. No. 4,926,826 to Nakaniwa teaches use of a conventional electronic air-fuel ratio control system. The control cycle is based on the transport delay oscillator. A first-order control term seeks to restore the air-fuel ratio to a desired target value. A second-order term, proportional to mass airflow and inversely proportional to engine speed, is used to improve transient response. Control is achieved by adjustment of the integration rate. The system employs a fuel wavefront.

It is an object of the present invention to improve the reduction of exhaust emissions on internal combustion engines operating on gaseous alternative fuels using a simple, low-cost air-fuel ratio controller.

DISCLOSURE OF THE INVENTION

The above object has been met by a modification to the prior art limit-cycle controller to maintain the air-fuel ratio near the optimum level. The output signal of the standard exhaust gas oxygen sensor found on nearly all modern vehicles is used to measure the variable engine transport delay. The reciprocal of this engine transport delay is in turn used to approximate the variable engine mass air-flow.

A change in mass air-flow necessitates a corresponding change in fuel-flow. To accomplish the needed change, the duty cycle of the modified limit-cycle controller is adjusted during either a rich or lean phase as a function of the approximation to engine mass air-flow with a resulting significant reduction in exhaust emissions using a very simple control strategy (as shown in FIG. 5, the duration of the enrichment phase is extended in proportion to the engine mass air-flow). Compatibility of the modified limit-cycle controller with the needs of typical catalytic converters is provided by an inherent bias toward richness resulting from the extension of the enrichment phase. This control strategy, which incorporates the features of the transport-delay-oscillator, is able to track variations in the stoichiometric level at more than twice the rate of the prior art limit-cycle controller. The combined result of these improvements is a large reduction of exhaust emissions under realistic driving conditions.

In an alternative embodiment the duration of a fuel reduction phase, rather than the enrichment phase, is extended in proportion to the variable mass air-flow. And in a third embodiment a selectable phase is extended.

BEST MODE FOR CARRYING OUT OF INVENTION

Figure 1:
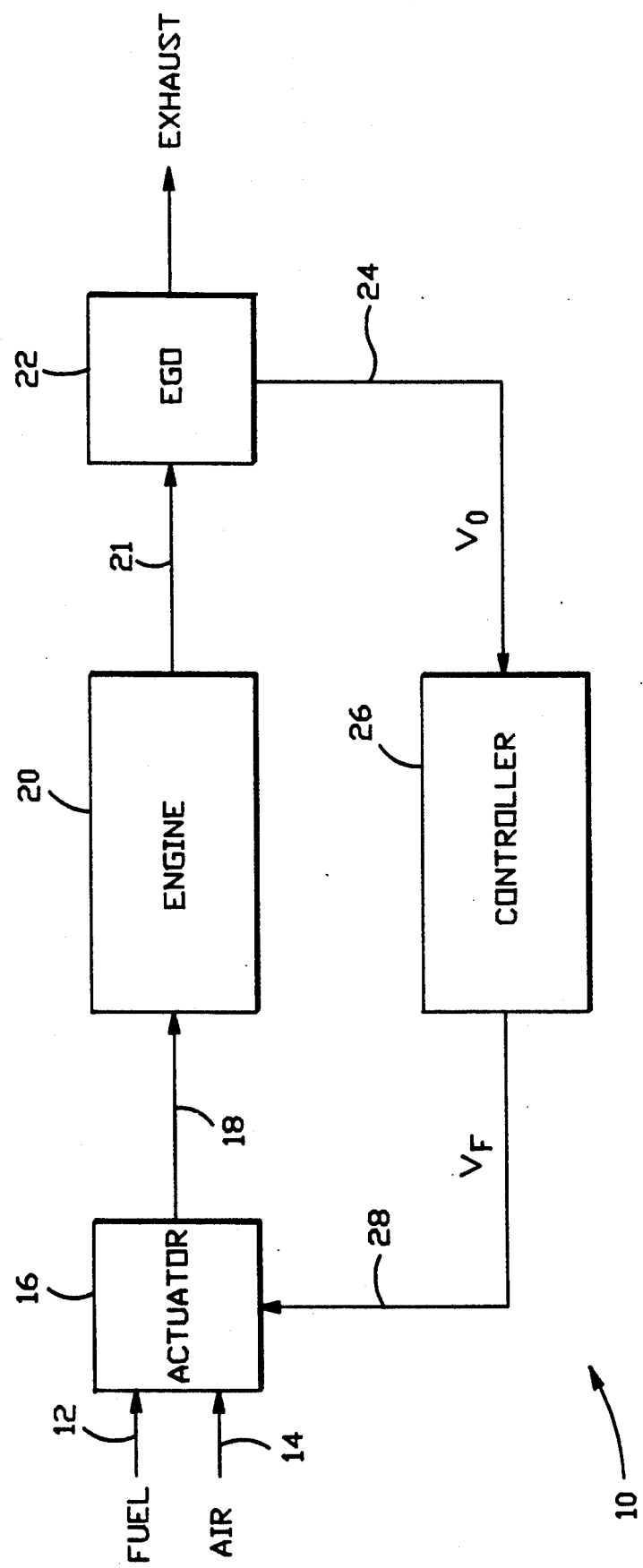
FIG. 1 is a simplified block diagram of a basic closed-loop fuel control system used in the prior art and the present invention.

With reference to FIG. 1, a closed loop control system 10 for an automotive exhaust system is generally depicted. Fuel in line 12 and air in line 14 are combined in a fuel metering actuator 16 resulting in an airfuel mixture carried by line 18. The air-fuel mixture enters an internal combustion engine 20 and leaves in the form of exhaust gases in line 21. The exhaust gas line 21 is connected to an exhaust gas oxygen sensor 22 which generates an electrical output signal $V_O$ on electrical line 24. A controller 26 receives the sensor output signal $V_O$ from line 24 and generates therefrom an electrical actuator control signal $V_F$ on line 28. The fuel metering actuator 16 adjusts the amount of fuel which is combined with air in proportion to the voltage level of the actuator control signal $V_F$.

When system 10 is operated as a closed loop, the controller 26 adjusts the voltage level of the actuator control signal $V_F$ to maintain the air-fuel ratio at stoichiometry, a level which results in optimum engine performance and produces exhaust gas emissions which are nearly compatible with gasoline catalytic converters.

The controller 26 monitors transitions between voltage levels of the sensor output signal $V_O$ to obtain information relating to error existing between the air-fuel ratio and the stoichiometric level. The controller 26 adjusts the fuel metering actuator control signal V., and hence the air-fuel ratio, to reduce this error and move the air-fuel ratio closer to the stoichiometric level.

The exhaust gas oxygen sensor 22 used in the present invention is of the type which produces an output signal $V_O$ having a more positive voltage level for a fuel-rich mixture and a less positive voltage level for a fuel-lean mixture. At the stoichiometric level, the exhaust gas oxygen sensor 22 is sensitive to slight shifts in the exhaust gas oxygen concentration and will produce its RICH output voltage level for concentrations which are slightly rich, and will produce its LEAN output voltage level for concentrations which are slightly lean. Ideally, the exhaust gas oxygen sensor 22 switches between its output levels rapidly as the oxygen concentration shifts between its rich and lean conditions, and vice versa. The actual operation of a typical sensor may deviate from this ideal (*Understanding Automotive Electronics*, pages 130–135) by exhibiting hysteresis and sensitivity to temperature near the transition point. The use of a fuel wavefront overcomes the effects of these differences from ideal by moving the air-fuel ratio rapidly through the sensor transition point. This is one of two uses of the fuel wavefront, the other being to effect operation in a transport-delay-oscillator mode.

For a four-cycle internal combustion engine, an air mass remains within the system throughout two revolutions of the engine crankshaft, resulting in a delay between a change in the voltage level of control signal $V_F$ and a corresponding change in the voltage of the exhaust gas oxygen sensor output signal $V_O$. This delay will be referred to as the engine transport delay.

As stated above, the amount of fuel present in the air-fuel mixture in line 18 is proportional to the voltage level of the actuator control signal $V_F$ on line 28. The fuel metering actuator 16 will add increasingly more fuel to the air-fuel mixture as the actuator control voltage $V_F$ is increased. Consequently, lower voltage levels of the actuator control signal $V_F$ produce lean air-fuel mixtures because the amount of fuel being added is reduced, whereas higher voltage levels of the control signal $V_F$ produce rich air-fuel mixtures because the amount of fuel being added is greater.

The value of $\lambda$, the normalized air-fuel ratio, at stoichiometry is 1.00 ($\pi$ is defined in *Understanding Automotive Electronics* at page 169). Air-fuel ratios more rich than stoichiometry have values of $\lambda$ less than 1.00, and ratios more lean (or less rich) than stoichiometry have values of $\lambda$ greater than 1.00. This point is being made because confusion can arise from the fact that levels above stoichiometry in FIG. 4 correspond to RICH levels yet $\lambda$ is less than 1.00 and vice versa.

Figure 4:
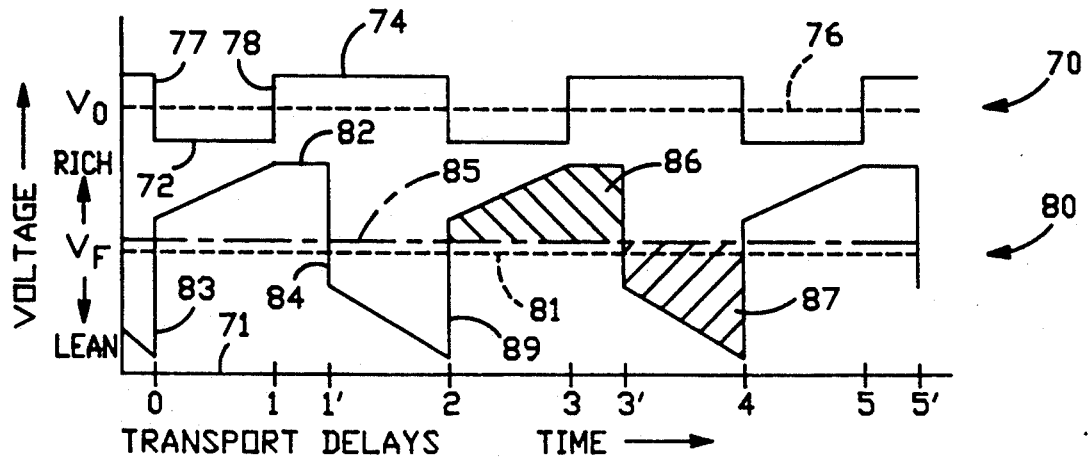
FIG. 4 shows the $V_F$ and $V_O$ waveforms for a modified transport delay oscillator version of the FIG. 1 controller of the present invention.

FIG. 4 depicts the sensor output voltage $V_O$ 70 and actuator control voltage $V_F$ 80 for the modified transport delay mode of operation employed by the present invention. At the end of each enrichment cycle, the voltage level of the actuator control signal $V_O$ is held approximately constant for a period of time 82 proportional to the variable mass airflow (inversely proportional to a current value 71 of the engine transport delay). Sudden changes in engine demand, as for example an abrupt change in a carburetor throttle angle, or a sudden change in engine loading caused by an abrupt shift of the automatic transmission, can be quickly tracked so that the air-fuel ratio is maintained at very close to the stoichiometric optimum operating level. This results in a significant decrease in the levels of unwanted emissions of carbon monoxide, nitrous oxides and unburned hydrocarbons.

Sensor output voltage $V_O$ (FIG. 4) has a stoichiometric level depicted by dashed line 76, a LEAN level depicted by line segment 72, a RICH level depicted by line segment 74 and transitions between RICH and LEAN levels depicted by typical transitions 77 and 78. Actuator control signal $V_F$, generally indicated by waveform 80, has the approximate shape of the actuator control signal $V_F$ for the prior art transport delay oscillator control mode as depicted in waveform 60 of FIG. 3. Time increases to the right. Each enrichment phase of the control cycle is extended by an interval 82 that is approximately proportional to the variable mass airflow (inversely proportional to a current value 71 of the transport delay.)

Though in theory both the enrichment and reduction phases of a control cycle can be extended by an interval 82 approximately inversely proportional to a current value 71 of the transport delay, such an approach complicates the measurement of the transport delay. By adding the extension to a single phase only, the opposite phase, being determined solely by a single transport delay, will produce a sensor output signal which is a reasonably accurate representation of the current value of a dynamically changing transport delay.

Figure 5:
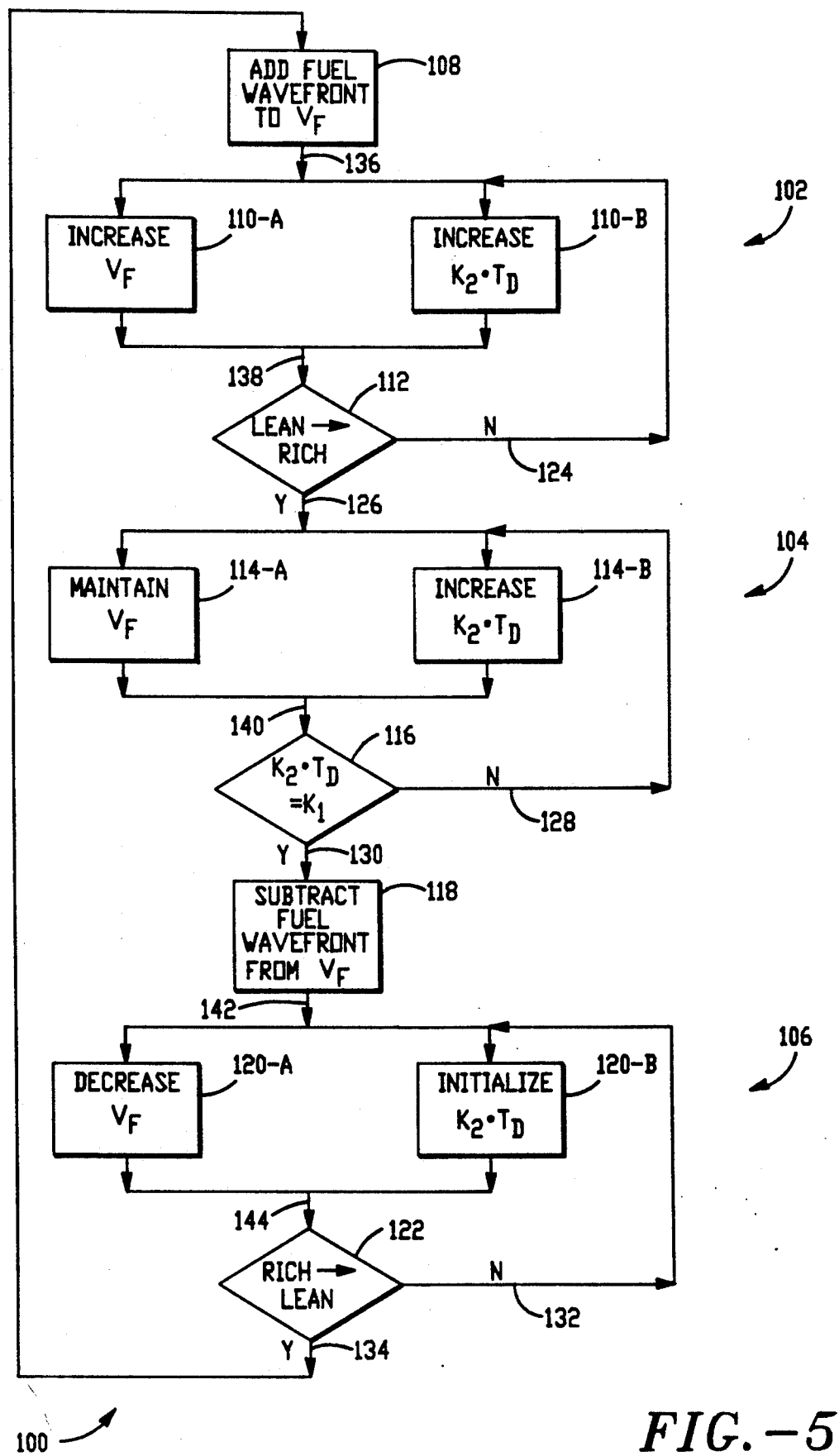
FIG. 5 is a flow diagram of a basic control cycle of the controller of the present invention.

FIG. 5 is a flow diagram depicting the method of operation of the controller 26 of the present invention as shown in FIG. 1. The variables being controlled are the fuel-metering actuator control signal $V_F$, and integrator output voltage $K_2^* T_D$. The inputs being used to effect the control of these variables are the LEAN and RICH voltage levels of the output signal $V_O$ of the exhaust gas oxygen sensor 22 of FIG. 1.

Limit-cycle 100 includes three sub-cycles: (i) the enrichment phase 102, during which $V_F$ and $K_2^* T_D$ are being increased; (2) the enrichment extension 104, during which $V_F$ is held approximately constant while $K_2{}^*t_D$ continues to be increased; and (3) the reduction phase 106, during which $V_F$ is decreased and $K_2{}^*T_D$ is initialized.

The enrichment phase 102 is immediately preceded by step 108 which adds the fuel wavefront to $V_F$. The reduction phase 106 is immediately preceded by step 118 which subtracts the fuel wavefront from $V_F$. The enrichment phase 102 includes simultaneously executed steps 110-A and 110-B and decision step 112 during which sensor signal $V_O$ is examined to determine whether it indicates a transition from the LEAN to the RICH level. The occurrence of the LEAN->RICH transition is used to terminate the enrichment phase 102 and begin the enrichment extension 104 which includes simultaneously executed steps 114-A and 114-B and decision step 116 Step 116 is used to terminate the enrichment extension 104 when the variable $K_2{}^*T_D$ becomes equal to constant $K_1$. The significance of that comparison will be explained below. The reduction phase 106 includes simultaneously executed steps 120-A and 120-B and decision step 122 used to terminate the reduction phase upon occurrence of a RICH→LEAN transition of the sensor output signal $V_O$. The end of a reduction phase 106 is followed immediately by step 108, adding a fuel wavefront to control signal $V_F$, which is followed by another enrichment phase 102, etc., in a continuous "limit cycle" 100.

This control cycle 100 is referred to as a "limit cycle" in the broadest sense only. The operating cycle 100 of FIG. 5 describes a modified transport-delayoscillator mode of operation: "transport-delay-oscillator" because of the use of the fuel wavefront, and "modified" because of the enrichment extension 104. The voltage level of control signal $V_F$ is controlled to track small variations in the stoichiometric level, and hence in the steady-state condition depicted in FIG. 4, is seen to move in a "limit cycle" about the "set-point of stoichiometry", represented by the dashed line 81. The average voltage level of $V_F$ may be thought of as "remembering" the stoichiometric level 81.

The extension 104 of the enrichment phase 102 is proportional to a current value of the engine variable mass air-flow. As has been pointed out above, a change in the air-flow requires a corresponding change in the fuel-flow to maintain operation at stoichiometry (see *Understanding Automotive Electronics*, chapters 5 and 6). The extension 104, or rather the "duration" of the extension, may be thought of as the mechanism used by the controller 26 to make rapid changes in the air-fuel ratio which are proportional to the mass air-flow. This extension 104 is reflected in the "shape" of control signal $V_F$, as depicted in the "steady-state" diagram of FIG. 4 where that portion of $V_F$ waveform 80 shown above dashed line 81 has a longer duration between transitions 83 and 84 than it does between 84 and the immediately following transition 89. The result of the average amount of the extension 104 is to cause waveform 80 to become centered about an "offset" represented by broken line 85. Line 85 is on the RICH side of stoichiometric level 81 resulting in exhaust gas concentrations produced by the combustion of an alternative fuel which are more compatible with the typical gasoline catalytic converter (see *Car Electronics*, FIG. 3.9 at page 64).

Control signal $V_F$ is thus doing triple duty: (1) it is used to implement a fuel wavefront; (2) it cycles about a set-point of stoichiometry (or the biased "offset" used for fuel compatibility); and (3) its pulse width is the mechanism used to rapidly change the air-fuel ratio in response to changes in the engine variable mass air-flow. Next we consider in some detail the manner in which this last task is accomplished.

Figure 2:
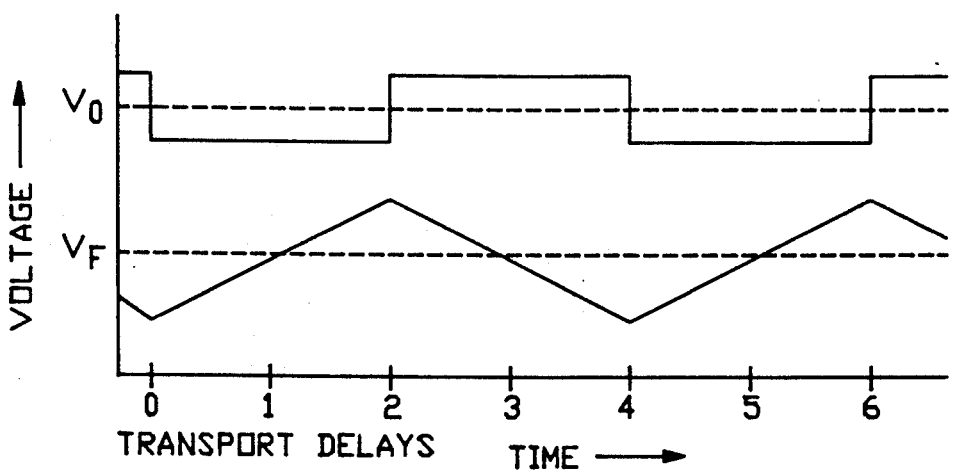
FIG. 2 shows waveforms for the exhaust gas oxygen sensor output signal $V_O$ and the fuel metering actuator control signal $V_F$ for a prior art limit-cycle version of the controller of FIG. 1.

Recall that the air-fuel ratio is to be adjusted in proportion to the mass air-flow. Many prior art emissions control systems use an actual mass air-flow sensor. U.S. Pat. No. 4,945,882 to Brown et al. teaches a closed-loop air-fuel ratio controller having a variety of conventional engine parameter sensors including a mass air-flow sensor, FIGS. 2 and 6 (see also *Understanding Automotive Electronics*, at pages 126–127). The present invention is to be used with an engine having an exhaust gas oxygen sensor capable of producing RICH and LEAN voltage levels at its output $V_O$. This output signal, actively filtered to remove unwanted air-fuel ratio shifts mostly due to differential cylinder air-fuel ratios, is used to approximate mass air-flow.

The approximation is possible because the interval between a RICH→LEAN transition 77 (FIG. 4) and the immediately following LEAN->RICH transition 78 is equal to the variable engine transport delay $T_D$. The transport delay is related to the mass air-flow as the reciprocal of the mass air-flow. Thus the reciprocal of the transport delay is directly proportional to mass airflow. Over the narrow operating region necessary to control the air-fuel ratio of the present invention, a straight-line approximation of the reciprocal has been found to be adequate to obtain a remarkable degree of emissions reduction. The straight line segment used to represent mass air-flow is represented by the expression $K_1 - K_2{}^*T_D$. In other words, mass air-flow is represented by a variable whose value is equal to a first constant $K_1$ minus the product of a second constant $K_2$ and the transport delay $T_D$.

Figure 3:
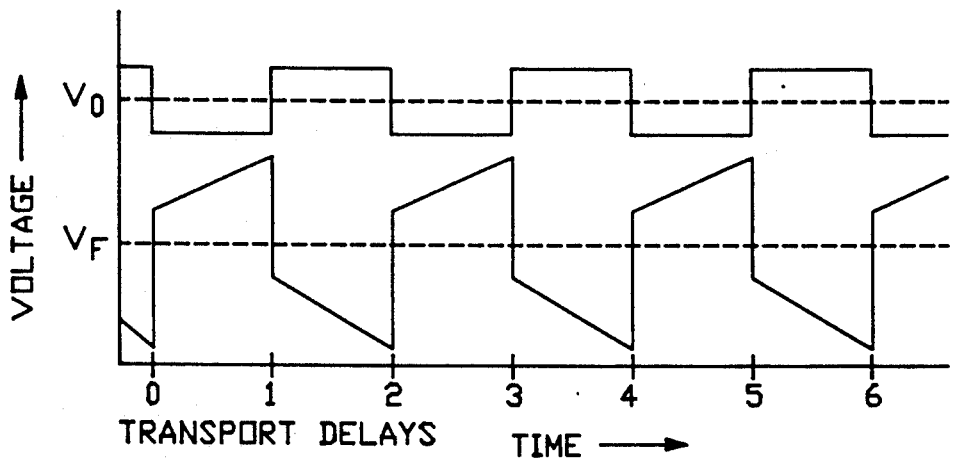
FIG. 3 shows the sensor output and actuator control waveforms for the improved prior art transport delay oscillator version of the controller of FIG. 1

FIG. 5 provides some insight into how the three tasks borne by the control signal $V_F$ are accomplished. The first task was the use of $V_F$ to implement a fuel wavefront. This is accomplished by steps 108 and 118 which add and subtract, respectively, a fuel wavefront to $V_F$. The second task is the formation of a "limit cycle" about a set-point of stoichiometry. This is accomplished in steps 110-A and 120-A which, respectively, increase $V_F$ until a LEAN→RICH transition of sensor output signal $V_O$ occurs, and decrease $V_F$ until a RICH-→LEAN transition occurs (if we omitted the steps of enrichment extension 104, the controller 26 would exhibit the behavior of a standard transport-delay-oscillator as depicted in FIG. 3). The third task assigned control signal $V_F$ is the extension of the duration of the enrichment phase during which the voltage level of $V_F$ is held approximately constant while its duration is extended in proportion to the mass air-flow (the approximation of the reciprocal of the transport delay).

The manner in which this approximation is accomplished is shown in FIG. 5 in steps 110-B, 114-B, and 120-B and in the decisions made in steps 112, 116 and 122. During the reduction phase 106, the variable $K_2{}^*T_D$ is set to some initial value, for example "zero". When a RICH→LEAN transition occurs at step 122, the variable is increased at a constant rate in step 110-B until a LEAN→RICH transition is detected at step 112. Waveform 70 of FIG. 4 teaches that the interval between those two transitions, 77 and 78, of sensor output $V_O$ is equal to a current value of the engine variable transport delay. Hence the value of variable $K_2{}^*T_D$ is now proportional to the transport delay interval which existed during the interval between transition 77 and transition 78 in our present example. During steps 114-B and 116 of the extension phase 104, the value of variable $K_2{}^*T_D$ continues to be increased at the same rate as in steps 110-B and 112 until its value equals constant $K_1$. Note that the voltage level of actuator control signal $V_F$ was being maintained approximately constant throughout the time that $K_2{}^*T_D$ was being increased in steps 114-B and 116. Thus the duration of the interval of extension 104 is equal to the time required to increase $K_2{}^*T_D$ from the value it had at the start of the extension phase, i.e. a value proportional to the transport delay, to the moment when $K_2{}^*T_D$ equals $K_1$. This latter interval is the approximation of the reciprocal of the transport delay, and is proportional to the mass air-flow. In this manner, the output signal of a standard exhaust gas oxygen sensor is used to obtain a measure of mass airflow and a significant reduction of unwanted exhaust emissions.

I claim:

1. A method for reducing unwanted exhaust emissions for use with an internal combustion engine equipped with an air-fuel ratio limit-cycle controller and a fuel metering actuator responsive to a controller generated signal, the controller having an operating cycle including complementary fuel phases each having a duration, the engine having operating variables which include an air-fuel ratio, a stoichiometric level and a mass air-flow, the method comprising the steps of:

cyclically adjusting the level of the actuator control signal to center the operating cycle about the stoichiometric level;

determining a value of the mass air-flow;

comparing the air-fuel ratio with the stoichiometric level, and if these engine operating variables differ by more than a predetermined amount, adjusting the air-fuel ratio by extending the duration of a fuel phase in proportion to the value of the mass air-flow;

maintaining the level of the actuator control signal approximately constant during the step of extending the duration of a fuel phase; and continuously repeating these steps, whereby a change in engine air-flow produces a change in the air-fuel ratio which decreases the difference between the air-fuel ratio and the stoichiometric level with a consequent reduction in unwanted exhaust emissions.

2. The method of claim 1 wherein the controller complementary fuel phases include a fuel enrichment and a fuel reduction phase, and wherein a fuel enrichment phase is extended.

3. The method of claim 2 further including the steps of equipping the internal combustion engine to operate from a gaseous alternative fuel and operating the engine from such fuel.

4. The method of claim 1 further including the steps of equipping the internal combustion engine to operate selectively from gasoline or an alternative gaseous fuel, selecting a fuel and operating the engine from the selected fuel, and wherein the controller complementary fuel phases include a fuel enrichment and fuel reduction phase and wherein if the alternative gaseous fuel is selected the step of adjusting the duration of a fuel phase is accomplished by extending the duration of a fuel enrichment phase in proportion to the value of the mass air-flow.

5. A method for reducing unwanted exhaust emissions for use with an internal combustion engine equipped with an air-fuel ratio limit-cycle controller and a fuel metering actuator responsive to a controller generated signal, the controller having an operating cycle including complementary fuel phases each having a duration, the engine having operating variables which include an air-fuel ratio, a stoichiometric level, a mass air-flow, and a variable transport delay, the method comprising the steps of:

cyclically adjusting the level of the actuator control signal to center the operating cycle about the stoichiometric level;

determining a value of the mass air-flow by determining a value of the transport delay, forming the reciprocal of the value, and using the reciprocal of the value of the mass air-flow;

comparing the air-fuel ratio with the stoichiometric level, and if these engine operating variables differ by more than a predetermined amount, adjusting the air-fuel ratio by adjusting the duration of a fuel phase in proportion to the value of the mass air-flow; and continuously repeating these steps, whereby a change in engine air-flow produces a change in the air-fuel ratio which decreases the difference between the air-fuel ratio and the stoichiometric level with a consequent reduction in unwanted exhaust emissions.

6. The method of claim 5 wherein the controller complementary fuel phase include a fuel enrichment and fuel reduction phase, and wherein a fuel reduction phase is extended.

7. The method of claim 5 wherein the step of determining a value of the transport delay is accomplished by equipping the engine with an exhaust gas oxygen sensor producing an output signal having a pair of voltage levels and transitions therebetween, measuring the time between a predetermined pair of the transitions, and using the result as the value of the transport delay.

8. The method of claim 5 wherein the step of forming a reciprocal is accomplished by forming an approximation of the reciprocal.

9. The method of claim 8 wherein the step of forming an approximation of the reciprocal is accomplished by forming a product of a first constant and a value of the transport delay, forming a difference between a second constant and the product, and using the difference as the approximation of the reciprocal.

10. The method of claim 9 wherein the incorporated step of adjusting the duration of a fuel phase is accomplished by extending the duration in proportion to the approximation of the reciprocal.

11. The method of claim 10 further including the step of equipping the internal combustion engine to operate from a gaseous alternative fuel and operating the engine from such fuel.

12. The method of claim 5 further including the step of using a fuel wavefront to effect operation of the controller in a transport-delay-oscillator mode.

13. The method of claim 5 further including the step of forming a sum of an offset and the air-fuel ratio and comparing the sum with the stoichiometric level, whereby the operating cycle will be centered about the sum of the stoichiometric level and the offset.

14. The method of claim 13 further including the steps of equipping the internal combustion engine to operate selectively from gasoline or an alternative gaseous fuel, selecting a fuel and operating the engine from the selected fuel, and using a zero offset if the selected fuel is gasoline, else using a rich offset.

15. A method for reducing unwanted exhaust emissions for use with an internal combustion engine equipped with an air-fuel ratio limit-cycle controller and a fuel metering actuator responsive to a controller generated signal, the controller having an operating cycle including complementary fuel phases each having a duration, the engine having operating variables which include an air-fuel ratio, a stoichiometric level and a mass air-flow, the method comprising the steps of:

cyclically adjusting the level of the actuator control signal to center the operating cycle about the stoichiometric level;

determining a value of the mass air-flow;

forming a sum of an offset and the air-fuel ratio;

comprising the sum with the stoichiometric level, and if these engine operating variables differ by more than a predetermined amount, adjusting the air-fuel ratio by adjusting the duration of a fuel phase in proportion to the value of the mass air-flow, whereby the operating cycle will be centered about the sum of the stoichiometric level and the offset; and continuously repeating these steps, whereby a change in engine air-flow produces a change in the air-fuel ratio which decreases the difference between the air-fuel ratio and the stoichiometric level with a consequent reduction in unwanted exhaust emissions.

16. The method of claim 15 wherein the offset is selected to produce a rich air-fuel ratio.

17. The method of claim 15 wherein the offset is selected to produce a lean air-fuel ratio.

18. A method for reducing unwanted exhaust emissions by controlling an air-fuel ratio in an internal combustion engine operating on a gaseous alternative fuel and having an exhaust gas oxygen sensor, comprising the steps of:

(a) examining an output signal of the exhaust gas oxygen sensor to determine whether the air-fuel ratio is rich or lean;

(b) detecting a transition of the sensor output from a rich level to a lean level;

(c) rapidly increasing the output voltage of a first integrator by a first fuel wavefront step;

(d) setting an output voltage of a second integrator to an initial value;

(e) while the sensor output signal remains at the lean level, continuously repeating substeps (1)-(3), (1) increasing the output voltage of the first integrator at a first rate, (2) increasing the output voltage of a second integrator at a second rate, (3) adjusting the air-fuel ratio in proportion to the first integrator output voltage; and (f) detecting a transition of the sensor output signal from the lean level to the rich level;

(g) while the second integrator output voltage remains less than a predetermined threshold voltage, continuously repeating substeps (4)-(6), (4) maintaining the approximate level of the first integrator output voltage, (5) adjusting the air-fuel ratio in proportion to the first integrator output voltage, (6) increasing the output voltage of the second integrator at the second rate; and (h) detecting that the second integrator voltage equals the threshold voltage;

(i) rapidly decreasing the output voltage of the first integrator by a second fuel wavefront step;

(j) while the sensor output signal remains at the rich level, continuously repeating substeps (7) and (8), (7) decreasing the first integrator output voltage at a third rate, (8) adjusting the air-fuel ratio in proportion to the first integrator output voltage; and (k) continuously repeating steps (b) through (k).

19. A method for reducing unwanted exhaust emissions by controlling an air-fuel ratio in an internal combustion engine operating on a gaseous alternative fuel and having an exhaust gas oxygen sensor, comprising the steps of:

(a) examining an output signal of the exhaust gas oxygen sensor to determine whether the air-fuel ratio is rich or lean;

(b) detecting a transition of the sensor output signal from the rich level to the lean level;

(c) adding a first fuel wavefront constant to a first count;

(d) initializing a second count to zero;

(e) while the sensor output signal remains at the lean level, continuously repeating substeps (1)-(4), (b) incrementing the second count at a second rate, (2) incrementing the second count at a second rate, (3) converting the first count to an analog voltage level, and (4) adjusting the air-fuel ratio in proportion to the analog voltage level;

(f) detecting a transition of the sensor output signal from the lean level to the rich level;

(g) until the second count equals a predetermined maximum value, continuously repeating substeps (5) and (6), (5) maintaining the approximate level of the analog voltage, and (6) incrementing the second count at the second rate;

(h) detecting that the second count equals the maximum value;

(i) subtracting a second fuel wavefront constant from the first count;

(j) while the sensor output signal remains at the rich level, continuously repeating substeps (7)-(9), (7) decrementing the first count at a third rate, (8) converting the contents of the first count to the analog voltage level, and (9) adjusting the air-fuel ratio in proportion to the analog voltage level; and (k) continuously repeating steps (b) through (k).

* * * * *